(12) United States Patent
Martin et al.

(10) Patent No.: US 9,783,199 B2
(45) Date of Patent: Oct. 10, 2017

(54) DYNAMIC POSITIONING (DP) DRIVE-OFF (DO) MITIGATION WITH INERTIAL NAVIGATION SYSTEM

(71) Applicant: Transocean Sedco Forex Ventures Limited, George Town, Grand Cayman (KY)

(72) Inventors: Trenton Martin, Kingwood, TX (US); David Hollier, Katy, TX (US)

(73) Assignee: Transocean Sedco Forex Ventures Limited, George Town, Grand (KY)

( * ) Notice: Subject to any disclaimer, the term of this patent is extended or adjusted under 35 U.S.C. 154(b) by 0 days.

(21) Appl. No.: 15/068,303

(22) Filed: Mar. 11, 2016

(65) Prior Publication Data
US 2016/0264143 A1 Sep. 15, 2016

Related U.S. Application Data

(60) Provisional application No. 62/132,334, filed on Mar. 12, 2015.

(51) Int. Cl.
*B60W 30/18* (2012.01)
*G05B 17/02* (2006.01)
*G06F 17/16* (2006.01)

(52) U.S. Cl.
CPC ........ *B60W 30/18027* (2013.01); *G05B 17/02* (2013.01); *B60W 2400/00* (2013.01); *B60W 2520/105* (2013.01); *B60W 2900/00* (2013.01)

(58) Field of Classification Search
CPC ........ B60W 30/18027; B60W 2400/00; B60W 2520/105; B60W 2900/00; G05B 17/02

USPC ....................................... 701/21; 342/357.74
See application file for complete search history.

(56) References Cited

U.S. PATENT DOCUMENTS

| | | | |
|---|---|---|---|
| 2002/0007231 A1 | 1/2002 | Lohmiller | |
| 2006/0058929 A1 | 3/2006 | Fossen et al. | |
| 2006/0064211 A1 | 3/2006 | Johansen et al. | |
| 2007/0023389 A1 | 2/2007 | Hess | |
| 2007/0078575 A1 | 4/2007 | Wilson et al. | |
| 2007/0233389 A1* | 10/2007 | Stephens | B63B 21/50 702/6 |
| 2009/0043436 A1* | 2/2009 | Igarashi | B63H 25/42 701/21 |
| 2010/0088030 A1* | 4/2010 | Stephens | B63H 25/04 701/500 |

FOREIGN PATENT DOCUMENTS

| WO | 2012010818 A1 | 1/2012 |
|---|---|---|
| WO | 2012/080241 A1 | 6/2012 |

* cited by examiner

*Primary Examiner* — Marthe Marc-Coleman
(74) *Attorney, Agent, or Firm* — Norton Rose Fulbright US LLP

(57) ABSTRACT

Systems and methods for determining if a vessel is experiencing a drive-off event, identifying a subsystem causing the drive-off event, and controlling a vessel to correct the drive-off event are disclosed. The determining may include processing, with a processor of the dynamic positioning control system, a modeled vessel motion and a measured vessel motion to determine whether there is a discrepancy between the modeled vessel motion and the measured vessel motion. The dynamic positioning (DP) control system may then take action to control vessel motion based, at least in part, on the processing of the modeled vessel motion and the measured vessel motion.

19 Claims, 6 Drawing Sheets

DYNAMIC POSITIONING (DP) DRIVE-OFF (DO) MITIGATION WITH INERTIAL NAVIGATION SYSTEM

CROSS-REFERENCE TO RELATED PATENT APPLICATIONS

This application claims the benefit of priority of U.S. Provisional Patent Application No. 62/132,334 to Trenton Martin et al., filed on Mar. 12, 2015, and entitled "Dynamic Positioning Drive-off Mitigation with Inertial Navigation System," which is hereby incorporated by reference.

TECHNICAL FIELD

This disclosure relates to a method where an Inertial Sensor Assembly and its observations may be utilized to provide a DPO the immediate determination as to whether a vessel is in a drive-off situation and further aid in identifying the bad actor.

BACKGROUND

Marine vehicles are generally unanchored or untethered to any solid ground. The nature of being out in open water with no references points can make navigation difficult. In fact, it can be so difficult that even maintaining a fixed position on the earth is challenging. Despite the challenges, in some cases maintaining such a fixed position over long periods of times is essential. For example, when a drilling vessel extends a drilling riser through the water to the subsurface to drill for oil, the position of the drilling riser is critical to making a correct incision into the underground well. Further, once the drilling riser is in place, the vessel must maintain its position in order to prevent the drilling riser from disconnecting from the subsurface. Maintaining this position is referred to as "station keeping."

Conventionally, station keeping is performed by way of a Dynamic Positioning (DP) control system on marine vessels. The DP control system has a basic mathematical requirement to establish and calculate various key parameters. These mathematical models incorporate equations of motion, which are used to characterize the pose and dynamics of the vessel. The dynamics of a marine vessel include six degrees of freedom (DOFs) for motion. These DOFs are surge, sway, heave, roll, pitch and yaw. Three parameters in particular are given more weight, and those three are surge, sway and yaw. Thus, the DP system's primary role is to maintain the surge, sway, and yaw set point by way of a control system that sends commands to the vessel's thruster drives. A DP drive-off (DO) occurs when a dynamically-positioned vessel erroneously has a position excursion from the desired set point. This can happen for various reasons, some of which are related to erroneous spatial observations provided by different sensors, such as GNSS, draught, and/or acoustics. If the mathematical model consuming these observations arrives at a state with high confidence in an erroneous measurement, the DP system's force and moment demands to the thrusters may be in error as well.

A DO poses a challenge to a vessel operator because even an experienced operator may not be able to identify if the control system is reacting to the environment correctly or if there is an error that is resulting in a DO. If a deficiency in the observables or model is identified the operator must isolate the source of the error. This process must be done accurately and in a relatively short amount of time.

BRIEF SUMMARY

A system that can identify, with a high degree of certainty, which position references and algorithms are not operating within acceptable limits can reduce the overall reaction time of the operator towards correcting the drive-off (DO). This reaction time has an inverse relationship with water depth due to the geometric relationship of the vessel, riser, and wellhead. As a result, DO mitigation and detection measures become increasingly more necessary in shallow water. An apparatus and method are described below that can be used to aid in rapidly determining if a vessel is experiencing a DO event and further identify the subsystem(s) that are at fault.

In one embodiment, a method for determining if a vessel is experiencing a drive-off event, identifying a subsystem causing the drive-off event, and controlling a vessel to correct the drive-off event is disclosed. The method includes the steps of: determining vessel motion with a dynamic positioning control system model for the vessel; measuring vessel motion with a sensor controlled independently from the vessel dynamic positioning control system; processing, with a processor of the dynamic positioning control system, the modeled vessel motion and the measured vessel motion to determine whether there is a discrepancy between the modeled vessel motion and the measured vessel motion; and/or controlling, by the processor of the dynamic positioning control system, the vessel motion based, at least in part, on the processing of the modeled vessel motion and the measured vessel motion. The method may further include identifying a parameter of the dynamic positioning control system model causing the discrepancy and adjusting the vessel motion based, at least in part, on the identification of the modeling parameter causing the discrepancy. The method may also further includes isolating the modeling parameter causing the discrepancy from the dynamic positioning control system model, updating the modeling parameter, and reintroducing the modeling parameter into the model after the modeling parameter has been updated.

The step of determining, measuring, processing, and controlling may be repeated, such as to obtain real-time identification and correction of a DO. The measuring of vessel motion may include measuring at least one of a velocity and a rotation of the vessel. The processing may include comparing the modeled vessel motion with the measured vessel motion. The dynamic positioning control system may model at least one of vessel surge, sway, heave, roll, pitch, and yaw to determine vessel motion. The controlling may include controlling at least one of the vessel surge, sway, and yaw. The controlling may further include sending commands to vessel thruster drives.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood,

DETAILED DESCRIPTION

In a dynamic positioning (DP) drive-off (DO) scenario, it is beneficial for the operator to be able to identify the source of the DO as quickly as possible. A DO is the deliberate movement of the vessel in an undesirable way as a result of erroneous logic or inputs. The operator needs to readily identify the source of the DP drive-off such that it can be immediately arrested and corrected. The bad actor(s) may be identified in an expedient manner by using an accurate sensor that independently measures true vessel motion and then comparing the sensor's observations to the DP system model states and reference sensors.

Figure 1:
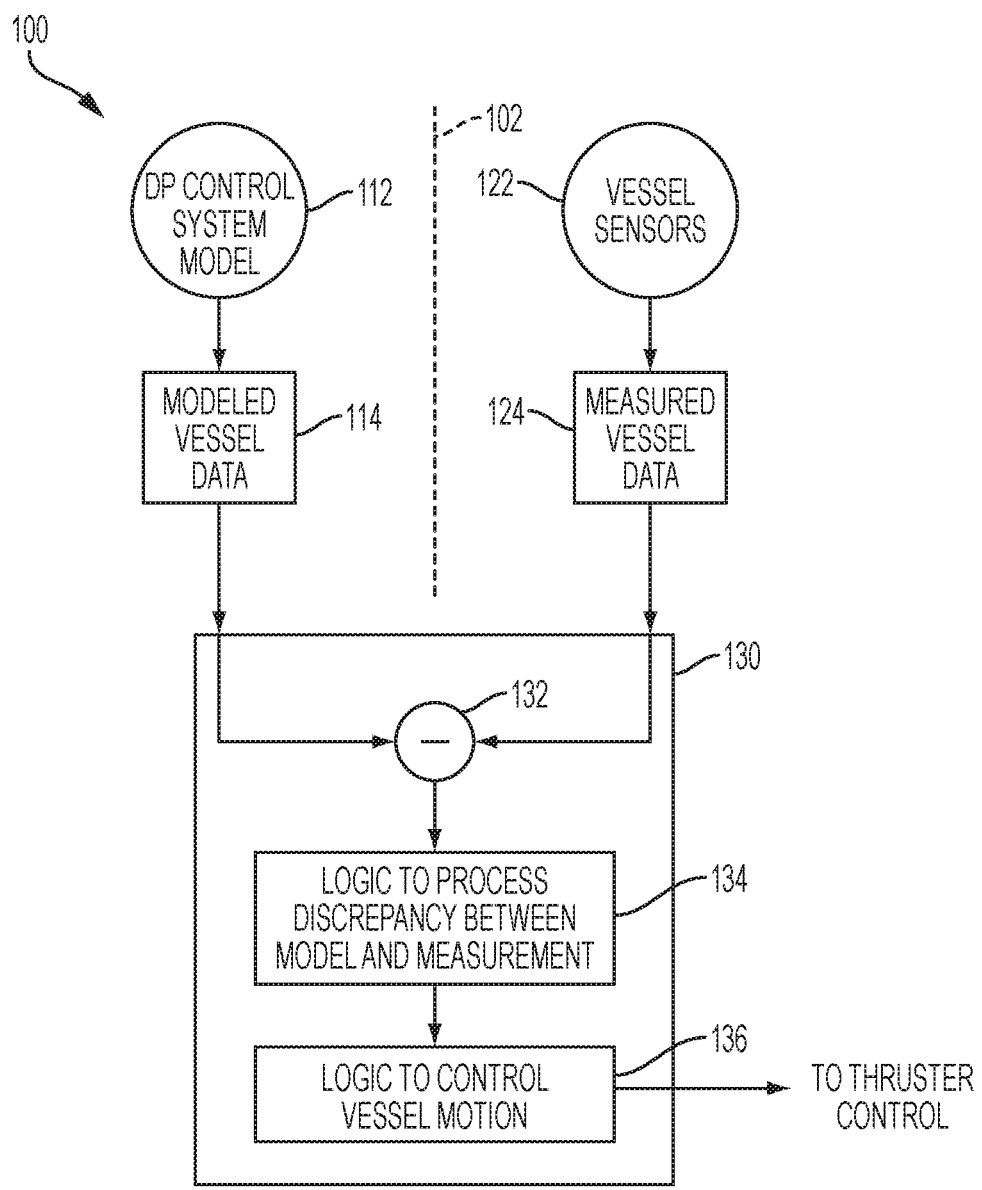
FIG. 1 is a block diagram a dynamic positioning (DP) drive-off (DO) measurement system according to one embodiment of the disclosure.

FIG. 1 is a block diagram a dynamic positioning (DP) drive-off (DO) measurement system according to one embodiment of the disclosure. A system 100 may include data inputs 112 and 122 for receiving dynamic positioning (DP) control system model data 114 and measured vessel data 124. As illustrated by isolation line 102, the vessel motion may be measured with a sensor controlled independently from the vessel dynamic positioning control system that generates the system model 112 and model data 114. Data 114 and 124 may be provided to a processor 130. The processor 130 may include logic 132 for calculating a difference between the measured vessel data 124 and the modeled vessel data 114. The output of logic 132 may be provided to logic 134 to process any discrepancy between the model and measurement, as will be described in further detail below. In one embodiment, the logic 134 may include logic to determine if a drive-off event is occurring or will occur and then determine the subsystem responsible for the drive-off condition. The output of logic 134 may be provided to logic 136 to control vessel motion. In some embodiments, the logic 134 may provide output to a notification system or dashboard to report the drive-off event and malfunctioning subsystem to an operator. The logic 136 may be the dynamic positioning (DP) system, or the logic 136 may be logic for generating control signals or other information that are transmitted to the dynamic positioning (DP) system or other ship systems. The output of the logic 136 may be passed to other systems to either directly or indirectly control the thrusters of a system (such as a drilling rig) having the dynamic positioning (DP) system. In one embodiment, the logic 136 may control the vessel to correct the drive-off event.

Figure 2:
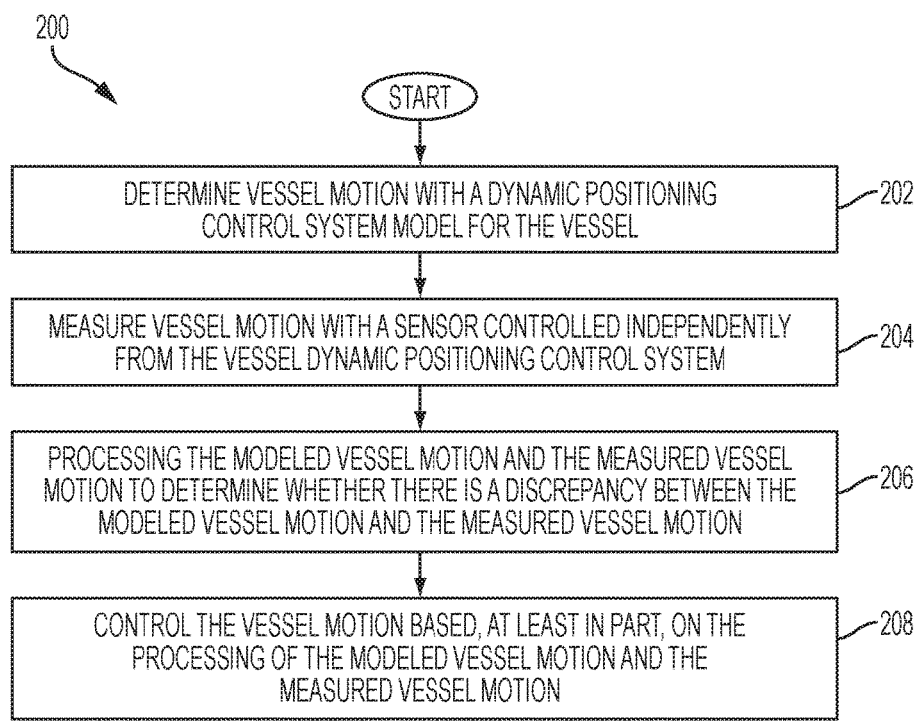
FIG. 2 is a flow chart illustrating a method of determining if a vessel is experiencing a drive-off event and correcting the drive-off event according to one embodiment of the disclosure.

FIG. 2 is a flow chart illustrating a method of determining if a vessel is experiencing a drive-off event and correcting the drive-off event according to one embodiment of the disclosure. A method 200 begins at block 202 with determining vessel motion with a dynamic positioning control system model for the vessel. Next, at block 204, the method 200 continues with measuring vessel motion with a sensor controlled independently from the vessel dynamic positioning control system. Then, at block 206, the method 200 proceeds with processing, with a processor of the dynamic positioning control system, the modeled vessel motion and the measured vessel motion to determine whether there is a discrepancy between the modeled vessel motion and the measured vessel motion. Next, at block 208, the method 200 continues with controlling, by the processor of the dynamic positioning control system, the vessel motion based, at least in part, on the processing of the modeled vessel motion and the measured vessel motion.

Figure 3A:
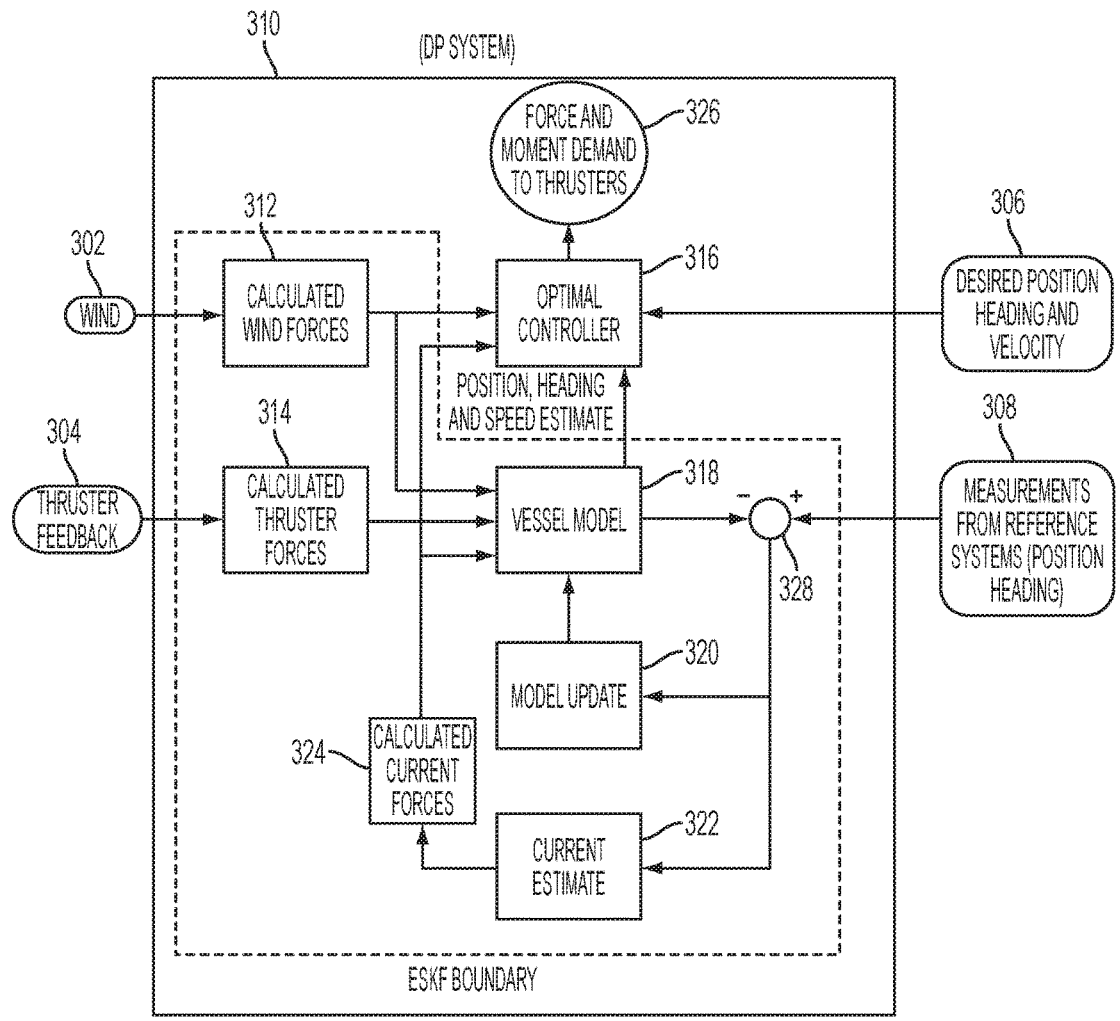
FIGS. 3A and 3B are a block diagram illustrating a control and monitoring system for a drilling rig that includes a dynamic positioning (DP) drive-off (DO) measurement system according to one embodiment of the disclosure.
Figure 3B:
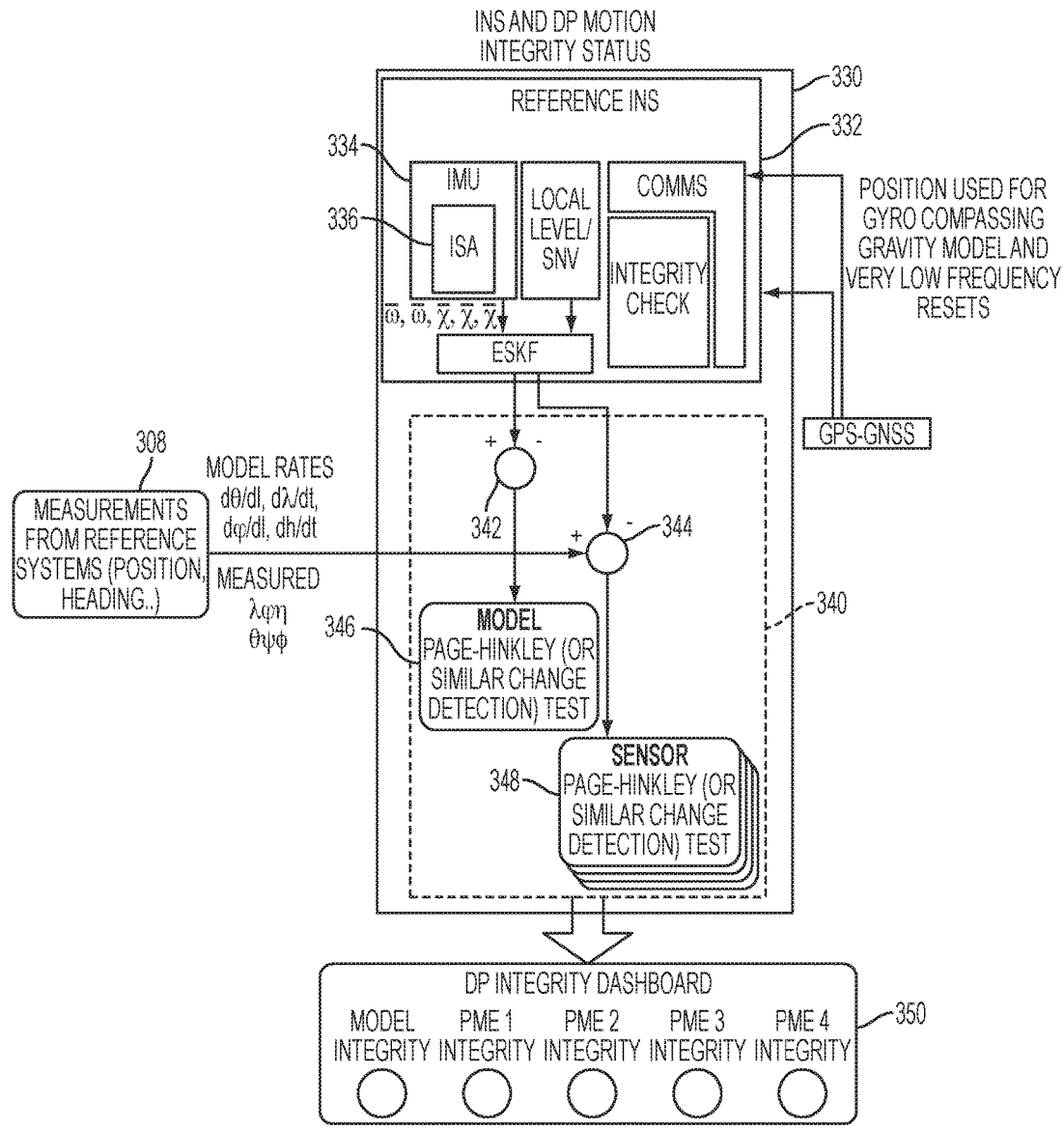

FIGS. 3A and 3B are a block diagram illustrating a control and monitoring system for a drilling rig that includes a dynamic positioning (DP) drive-off (DO) measurement system according to one embodiment of the disclosure. FIGS. 3A-3B show a block diagram of certain elements in a DP drive-off measurement system. The DP system as depicted in FIGS. 3A-3B may be continuously estimating the DP model positions and velocities as results of various sensor observations are received from the sensors. Referring first to FIG. 3B, an Inertial Navigation System (INS) 332 may include Inertial Sensor Assemblies (ISAs) 336 in an IMU 334 that provide velocity rate and rotation rate information. The ISAs 336 may be based on ring-laser gyro technology and/or macro electro mechanical accelerometers. The ISAs 336 may be part of a reference INS system 332 included in an INS and DP motion integrity status monitor 330. The reference INS system 332 may receive inputs from various sensors, including positioning sensors such as a global positioning system (GPS). Outputs from the reference INS system 332 may be provided to processing system 340, which may supply the data from ISA 336 to a Page-Hinkley test model 346 through module 342. The system 340 may also combine the data received from the ISA 336 with measurements 308 from other reference systems (e.g., position and heading information) with summer block 344, and provide that data to a sensor Page-Hinkey test models 348. By processing the outputs of the models 346 and 348, the monitor 330 may generate information for display on a DP integrity dashboard 350. The dashboard 350 may include, for example, toggle lights indicating the presence or loss of integrity of the model or PMEs 1, 2, 3, or 4.

Further processing may be performed in a DP system 310 shown in FIG. 3A. The DP system 310 may receive information 306, such as desired position, heading, and velocity, and information 308, such as measurements from reference systems including position and heading. The DP system 310 may also receive information from sensors, such as wind sensor 302 and thruster feedback sensor 304. Information from sensors 302 and 304 may be used to calculate wind forces on a vessel at block 312 and thruster forces on the vessel at block 314. The calculated forces from blocks 312 and 314 may be supplied to a controller block 316 and a vessel model block 318. The controller block 316 and the vessel model block 318 may also receive information regarding other forces on the vessel from force calculation block 324, which is based on a current estimate of conditions received from block 322 based on accumulated information from summer block 328. The vessel model at block 318 may be updated based on processing in block 320 based on the accumulated information from summer block 328. The vessel model at block 318 may be provided to controller 316, along with other force information, upon which the controller 316 decides a force and moment demands for the thrusters and issues commands to operate the thrusters and maintain the vessels position or move to a desired position. The various feedback paths through the DP system 310 may be used to maintain dynamic positioning, and the various processing paths of monitor 330 may be used to determine when integrity of a system is failing and alert an operator. The models may then be updated to correct for errors in equipment and other conditions on the vessel and dynamic positioning (DP) for the vessel be maintained.

Figure 4:
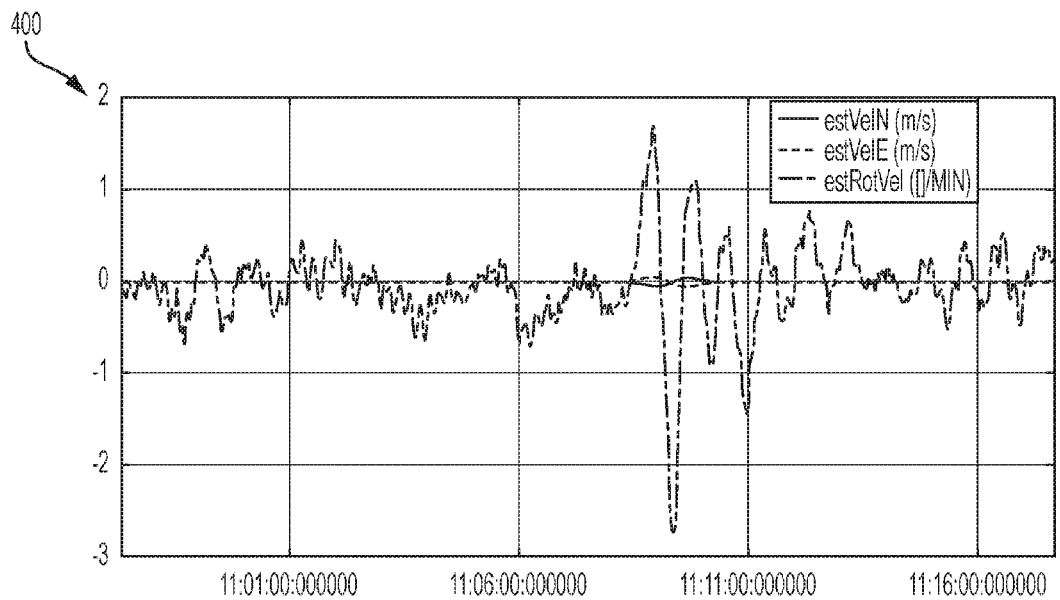
FIG. 4 is a graph of example logged dynamic positioning (DP) data including horizontal velocities and yaw rate according to one embodiment of the disclosure.

FIG. 4 is a graph of example logged dynamic positioning (DP) data including horizontal velocities and yaw rate according to one embodiment of the disclosure. In graph 400 of FIG. 4, the DP system is both estimating and logging these three states (e.g., horizontal velocities and yaw rate) from an estimator. They have already had the DCM (direction cosine matrix) and mapping transformation applied to bring them into earth frame coordinates reference to a common point on the vessel. Once leveling and gyro compassing is complete the INS may output the same measured observables in the corresponding earth reference frame.

Figure 5:
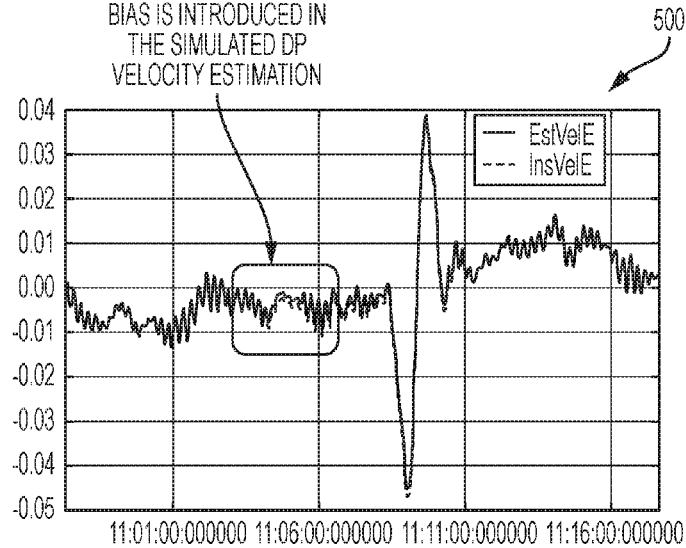
FIG. 5 is a graph of example dynamic positioning (DP) model estimated velocities with simulated INS estimated velocities where a drive-off is simulated to demonstrate the change detection according to one embodiment of the disclosure.

FIG. 5 is a graph of example dynamic positioning (DP) model estimated velocities with simulated INS estimated velocities where a drive-off is simulated to demonstrate the change detection according to one embodiment of the disclosure. A graph 500 of FIG. 5 shows an illustration of Easting's—Plotted the DP model estimated velocities with simulated INS estimated velocities. In this data set a drive-off is simulated to demonstrate the change detection. The actual comparison and derivation of the differences of the measured vs. model can initially be simple, such as by looking just at the model rates compared to the INS rates as calculated from the following equation:

$$\begin{bmatrix} \Delta \dot{\theta} \\ \Delta \dot{\lambda} \\ \Delta \dot{\varphi} \\ \Delta \dot{h} \end{bmatrix} = \begin{bmatrix} \dot{\theta}_m \\ \dot{\lambda}_m \\ \dot{\varphi}_m \\ \dot{h}_m \end{bmatrix} - \begin{bmatrix} \dot{\theta}_{ins} \\ \dot{\lambda}_{ins} \\ \dot{\varphi}_{ins} \\ \dot{h}_{ins} \end{bmatrix}$$

where θ is the vessel yaw, λ and φ are the vessel geodetic latitude and longitude, and h is the ellipsoidal height. These values can readily be transformed into any defined projection or reference frame currently configured for use in the DP system. The resultant differences Δθ, Δλ would then be used in a drift (or change direction) mechanism.

There are various concept drift schemes, including using simple alarm thresholds, but they may need to be regularly adjusted for biases. The methods include but are not limited to CUMSUM, geometric moving average, rigorous statistical methods, and a change detection algorithm referred to as Page-Hinkley. These change detection methods may allow for sequential inspection of the data to detect change in the normal behavior of a process. For example, a method may include monitoring drift in the mean of a time series as computed in the following equation:

$$m_T := \sum_{t=t_0}^{T} (x_t - \bar{x}_T - \delta)$$

where x! is the mean of the data set up to and including from t!=1 to T. The test generates a logical high whenever m!−M!>ρ, where ρ is at the user selectable threshold. One example value is ρ=4σ/δ, where σ is the standard deviation of the series.

Figure 6:
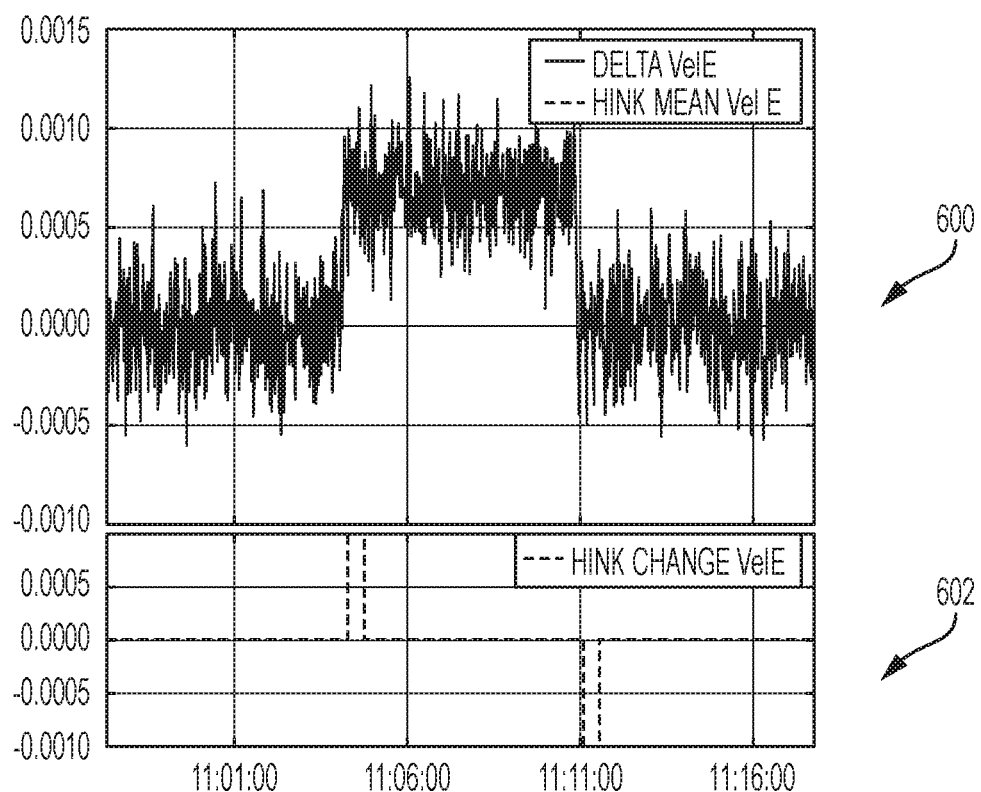
FIG. 6 is a graph illustrating an example application of the Page-Hinkley algorithm to a dynamic positioning (DP) model with INS velocity differences according to one embodiment of the disclosure.

FIG. 6 is a graph illustrating an example application of the Page-Hinkley algorithm to a dynamic positioning (DP) model with INS velocity differences according to one embodiment of the disclosure. Graphs 600 and 602 of FIG. 6 illustrate the application of the Page-Hinkley algorithm applied to DP model-INS velocity differences. In the lower graph 602 a logical hi and low (positive change, negative change) are illustrated during the simulated drive-off event. Graph 600 shows a noisy signal corresponding to the experimentation addition of white noise added to an original velocity signal. The emulated INS velocity was differenced with the model velocity (with induced track bias). This difference then had the Page-Hinkley test successfully applied in the graph 602 where the reader can see the resultant discrete Hinkley values indicating a positive change was detected then later a negative change.

A drive-off detection and identification tool including features described above can also be implemented, in part or in whole, in software. This would require exposing the required DP parameters and PMEs on a field bus connection and then comparing them to an installed inertial solution. In one embodiment, this DP drive-off detection algorithm may be instantiated as a subsystem (equations and display) within an INS. In another embodiment, this DP drive-off detection algorithm may reside within the DP system itself.

The schematic flow chart diagram of FIG. 2 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for determining if a vessel is experiencing a drive-off event, comprising:
   determining vessel motion with a dynamic positioning control system model for the vessel;
   measuring vessel motion with a sensor controlled independently from the vessel dynamic positioning control system;
   processing, with a processor of the dynamic positioning control system, the modeled vessel motion and the measured vessel motion to determine whether there is a discrepancy between the modeled vessel motion and the measured vessel motion; and
   controlling, by the processor of the dynamic positioning control system, the vessel motion based, at least in part, on the processing of the modeled vessel motion and the measured vessel motion.

2. The method of claim 1, further comprising identifying a parameter of the dynamic positioning control system model causing the discrepancy, wherein controlling the vessel motion comprises adjusting the vessel motion based, at least in part, on the identification of the modeling parameter causing the discrepancy.

3. The method of claim 2, further comprising isolating the modeling parameter causing the discrepancy from the dynamic positioning control system model, updating the modeling parameter, and reintroducing the modeling parameter into the model after the modeling parameter has been updated.

4. The method of claim 3, further comprising repeating the steps of determining, measuring, processing, and controlling.

5. The method of claim 1, wherein measuring vessel motion comprises measuring at least one of a velocity and a rotation of the vessel.

6. The method of claim 1, wherein processing comprises comparing the modeled vessel motion with the measured vessel motion.

7. The method of claim 1, wherein the dynamic positioning control system models at least one of vessel surge, sway, heave, roll, pitch, and yaw to determine vessel motion.

8. The method of claim 1, wherein controlling comprises controlling at least one of the vessel surge, sway, and yaw.

9. The method of claim 1, wherein controlling further comprises sending commands to vessel thruster drives.

10. The method of claim 1, further comprising:
    identifying a subsystem causing the drive-off event; and
    controlling a vessel to correct the drive-off event.

11. An apparatus, comprising:
    a processor configured to perform the steps comprising:
       determining vessel motion with a dynamic positioning control system model for the vessel;
       measuring vessel motion with a sensor controlled independently from the vessel dynamic positioning control system;
       processing the modeled vessel motion and the measured vessel motion to determine whether there is a discrepancy between the modeled vessel motion and the measured vessel motion; and
       controlling the vessel motion based, at least in part, on the processing of the modeled vessel motion and the measured vessel motion.

12. The apparatus of claim 11, wherein the processor is further configured to perform steps comprising identifying a parameter of the dynamic positioning control system model causing the discrepancy, wherein controlling the vessel motion comprises adjusting the vessel motion based, at least in part, on the identification of the modeling parameter causing the discrepancy.

13. The apparatus of claim 12, wherein the processor is further configured to perform steps comprising isolating the modeling parameter causing the discrepancy from the dynamic positioning control system model, updating the modeling parameter, and reintroducing the modeling parameter into the model after the modeling parameter has been updated.

14. The apparatus of claim 13, wherein the processor is further configured to perform steps comprising repeating the steps of determining, measuring, processing, and controlling.

15. The apparatus of claim 11, wherein the step of measuring vessel motion comprises measuring at least one of a velocity and a rotation of the vessel.

16. The apparatus of claim 11, wherein the step of processing comprises comparing the modeled vessel motion with the measured vessel motion.

17. The apparatus of claim 11, wherein the dynamic positioning control system models at least one of vessel surge, sway, heave, roll, pitch, and yaw to determine vessel motion.

18. The apparatus of claim 11, wherein controlling comprises controlling at least one of the vessel surge, sway, and yaw.

19. The apparatus of claim 11, wherein controlling further comprises sending commands to vessel thruster drives.

\* \* \* \* \*